United States Patent

Saitou

[11] Patent Number: 4,462,043
[45] Date of Patent: Jul. 24, 1984

[54] METHOD FOR RECORDING COLOR SEPARATION PICTURE IMAGES AND AN OUTLINE IMAGE SIMULTANEOUSLY

[75] Inventor: Naotada Saitou, Kyoto, Japan

[73] Assignee: Dainippon Screen Seizo Kabushiki Kaisha, Japan

[21] Appl. No.: 397,460

[22] Filed: Jul. 12, 1982

[30] Foreign Application Priority Data

Jul. 22, 1981 [JP] Japan .................. 56-113535

[51] Int. Cl.$^3$ .................. H04N 1/46; G03F 3/08
[52] U.S. Cl. .................. 358/75; 358/80
[58] Field of Search .................. 358/75, 76, 78, 80, 358/96

[56] References Cited

U.S. PATENT DOCUMENTS 4,419,691 12/1983 Sing et al. .................. 358/80

Primary Examiner—John C. Martin
Assistant Examiner—Luan Nguyen
Attorney, Agent, or Firm—Hayes, Davis & Soloway

[57] ABSTRACT

A method for recording color separation picture images and an outline image simultaneously for use in a picture reproducing machine such as a color scanner and a color facsimile, wherein a plurality of color separation picture signals and an outline signal are obtained by scanning an original picture photoelectrically, wherein the outline signal is stored in a memory together with the color separation picture signals, in parallel, and then the stored signals are read out of the memory, in series, and wherein an exposure scanning means is controlled by the readout signals, thereby recording color separation picture images and an outline image on a photosensitive material in the same time.

3 Claims, 5 Drawing Figures

METHOD FOR RECORDING COLOR SEPARATION PICTURE IMAGES AND AN OUTLINE IMAGE SIMULTANEOUSLY

BACKGROUND OF THE INVENTION

The present invention relates to a method for recording color separation picture images and an outline image simultaneously for use in a picture reproducing machine such as a color scanner for plate making, a color facsimile, or the like, and more particularly relates to a method for recording a set of color separation picture images for color separation picture plates of magenta M, cyan C, yellow Y and black K, and an outline image for an outline finish masking, simultaneously, in a picture reproducing machine.

In a conventional color scanner for plate making, a plurality of color separation picture plates can be recorded on a photosensitive material in a single step, as disclosed in Japanese Pat. No. 1,010,876 (Japanese Patent Publication No. 52-18601), entitled as "A COLOR SEPARATION PICTURE SCANNING AND RECORDING SYSTEM".

An outline finish masking is used when the background of a picture is to be removed for printing and only the desired object in the picture is to be recorded. Usually, an opaque film having a transparent portion which conforms the outline of the desired object to be recorded, is overlapped on the original picture or the color separation image, and then this is exposed onto the photosensitive material, thereby obtaining a reproduction picture of the desired object excluding the background.

Therefore, the outline finish masking should exactly conform the outline of the desired object to be recorded. In the prior art, the outline finish masking is prepared by overlapping a transparent sheet on the original picture, drawing an outline of the desired object by tracing it by hand, and smearing out the unnecessary background by hand. However, this method involves a lot of time and labor, which is uneconomical and slow. Further, the obtained outline finish masking is often inaccurate.

SUMMARY OF THE INVENTION

It is an object of the present invention to provide a method for recording color separation picture images and an outline image simultaneously for use in a picture reproducing machine such as a color scanner for plate making, free from the aforementioned defects and inconveniences, which is capable of performing a quick and accurate operation without any skill.

According to the present invention there is provided a method for recording color separation picture images and an outline image simultaneously for use in a picture reproducing machine, comprising the steps of (a) obtaining a plurality of color separation picture signals and an outline signal by scanning an original picture photoelectrically, (b) storing the color separation picture signals and the outline signal into a memory, in parallel, (c) reading the color separation picture signals and the outline signal out of the memory, in series, and (d) controlling an exposure scanning means by the readout signals, thereby simultaneously recording color separation picture images and an outline image on a photosensitive material.

BRIEF DESCRIPTION OF DRAWINGS

In order that the present invention may be better understood, preferred embodiments thereof will be described with reference to the accompanying drawings, in which.

DESCRIPTION OF THE PREFERRED EMBODIMENT

Figure 1:
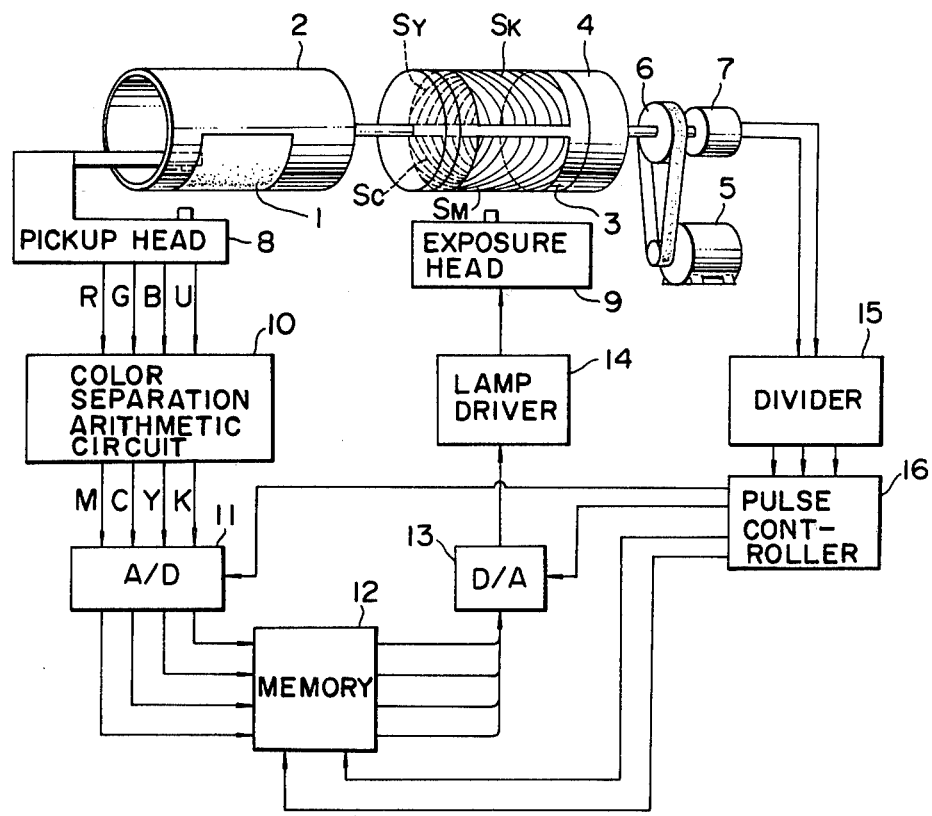
FIG. 1 is a block diagram of a color scanner which performs a method according to the present invention.

Referring to the drawings there is shown in FIG. 1 a color scanner which performs a method according to the present invention. An original picture cylinder 2 on which an original color picture 1 is mounted, and a recording cylinder 4 on which a photosensitive material 3 such as a photographic film is mounted, are coaxially arranged on a rotary shaft which is driven by drive means composed of a motor 5, an endless belt, and a pulley 6.

A pulse generator 7 is also coaxially mounted to the rotary shaft, and generates a plurality of timing pulses and one rotation pulse per one rotation of the cylinders 2 and 4, which are sent to a divider 15.

A pickup head 8 is adapted to be moved in the direction of the picture cylinder's axis, and an exposure head 9 is adapted to be moved in the direction of the recording cylinder's axis. The pickup head 8 scans the original picture 1 by projecting a minute light spot thereon, while the picture cylinder 2 is rotated, to obtain color separation picture signals R, G and B of red, green and blue and an unsharp signal U for emphasizing the picture detail, as hereinafter described in detail.

Thus the obtained signals are input to a color separation arithmetic circuit 10, and are converted into color separation recording signals M, C, Y and K for magenta, cyan, yellow and black. A conventional means, or the like, disclosed in Japanese Patent Publication No. 47-44501 can be used as the color separation arithmetic circuit 10.

The color separation recording signals M, C, Y and K are sent to an analog-digital converter 11, and are converted into digital signals by a sampling pulse obtained by a phase-lock loop circuit comprising a divider 15 and a pulse controller 16, the former sending the divided signals to the latter. The pulse controller 16 outputs writing and reading signals to a memory 12. The digital signals obtained are then stored in a memory 12 consecutively by the writing signal.

The color separation recording signals M, C, Y and K are consecutively read out of the memory 12, one by one, by the reading signal which is generated by the pulse controller 16 per a quarter rotation of the recording cylinder 4, and the readout signals are fed to a digital-analog converter 13 by a sampling signal generated by the pulse controller 16, and are converted into color separation recording analog signals.

Then, the color separation recording analog signals are fed to the exposure head 9 via a lamp driver 14 which controls the brightness of the exposure lamp, thereby recording a set of color separation reproduction pictures $S_M$, $S_C$, $S_Y$ and $S_K$ onto the photosensitive material 3 mounted on the recording cylinder 4, which are aligned in series in the direction of the recording cylinder's periphery.

According to the present invention, an outline finish masking image is also recorded on the photosensitive material 3 simultaneously by using an outline signal which is obtained in the color separation arithmetic circuit 10, as described hereinafter.

Figure 2:
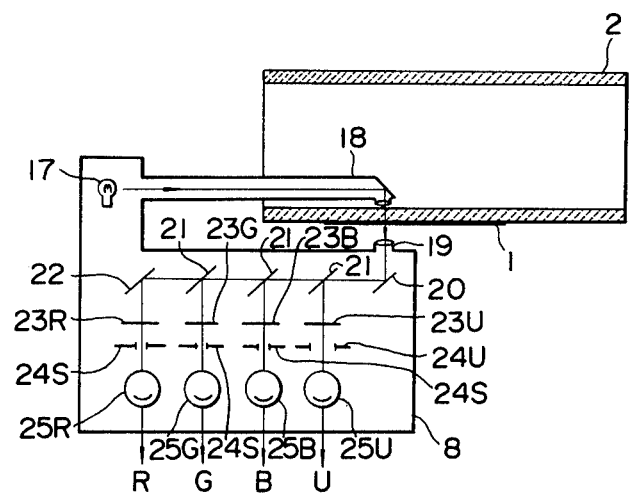
FIG. 2 is an enlarged sectional view of a pickup head shown in FIG. 1.

In FIG. 2 there is shown a pickup head 8 together with the picture cylinder 2. The light beam generated by a light source 17 included in the pickup head 8 is fed into the inside of the picture cylinder 2 through a ray pipe 18, and then is incident upon the original color picture 1 mounted to the outer periphery of the picture cylinder 2 via a mirror and a lens positioned in the free end of the ray pipe 18. The light passing through the original picture 1 is incident on a mirror 20 via a lens 19, and then onto half mirrors 21 and another mirror 22, whereby separating four light beams. The separated four light beams are then incident to the corresponding phototubes 25R, 25G, 25B and 25U through color separation filters 23R, 23G, 23B and 23U and aperture plates 24S and 24U. The aperture plates 24S have a relatively narrow aperture, and the aperture plate 24U possesses a relatively wide aperture, such as several times as wide as that of the aperture plates 24S.

Therefore, the phototubes 25R, 25G and 25B output the color separation picture signals R, G and B of a sharp signal, and the phototube 25U outputs the signal U of an unsharp signal for emphasizing the detail.

It is already known that a picture signal which emphasizes the picture detail is produced from the sharp signal and the unsharp signal. According to the present invention a signal obtained in the course of this conventional method is utilized when the outline signal is produced, as follows.

Figure 3:
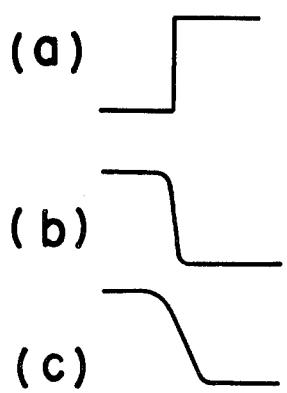
FIG. 3 shows a density distribution at a border of a picture pattern in an original picture, a sharp signal and an unsharp signal, the latter two being obtained by scanning the border portion of the original picture.
Figure 4:
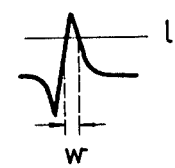
FIGS. 4 and 5 show wave forms for obtaining an outline signal.

In FIG. 3 there are shown a density distribution at a border of a picture pattern in an original picture (a), a sharp signal (b), and an unsharp signal (c), the sharp signal and the unsharp signal being obtained by scanning the border portion of the picture pattern in the original picture by using the aperture plates 24S and 24U.

In FIG. 3 there is shown a wave form of a signal which is obtained by subtracting the sharp signal (b) from the unsharp signal (c). Thus the obtained signal is then cut at a proper level l in order to pick up a signal component having a width w which represents an outline of the picture pattern, above this level, thereby obtaining an outline signal. This outline signal is once stored in the memory 12 together with the color separation recording signals, and then it is read out of the memory 12 in order to record an outline finish masking on the photosensitive material, as described above.

Figure 5:
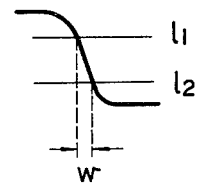

In FIG. 5 there is shown a wave form of an unsharp signal by which an outline signal is also to be produced. That is, the unsharp signal is sliced at certain upper and lower levels $l_1$ and $l_2$ in order to pick up a signal component having a width w between these upper and lower levels, thereby obtaining the outline signal.

In this embodiment, only the outline is recorded on the photosensitive material by using the outline signal, and hence the inside or the outside of the outline, which is to be masked, is smeared out with paint or the like by hand. However, this work is far easier than the outline tracing operation by hand. Therefore, the operating efficiency and the productivity is very much improved.

In this case, another method for producing an outline finish masking, disclosed in Japanese Patent Laying-Open Specification No. 47-17501, can be applicable.

In this embodiment, when the original color picture is photographed, the background of the desired picture pattern to be recorded is smeared out with a particular color tone in advance. Then, such a particular color picture is processed by the color scanner for plate making by scanning. On this occasion, the particular color tone is detected, and then the exposure head is so controlled according to the detected output signal that the photosensitive material may be exposed only when the particular color tone area is scanned.

In this method, the background is recorded as black and the other part, i.e. the desired picture pattern to be recorded, is not exposed, i.e. to become transparent. Hence, in this embodiment, an outline finish masking can be directly obtained, without smearing out the background area by hand.

The detection of the particular color tone can be performed in a conventional manner. For example, assuming that R/G and G/B are $\alpha$ and $\beta$, wherein R, G and B mean output signals or color separation signals of the pickup head, the particular color tone can be discriminated when $\alpha$ and $\beta$ are indicated by the predetermined values.

Although the present invention has been described in some detail by way of illustration and example for purposes of clarity of understanding, it will, of course, be understood that various changes and modifications thereof may be made in the form, details, and arrangements of the parts without departing from the scope of the present invention.

For example, the plane scanning means may be employed instead of the picture and the recording cylinder type, and the scanning can be performed by using a rotary mirror reflecting the light beam.

What is claimed is:

1. A method for recording color separation picture images and an outline image simultaneously for use in a picture reproducing machine, comprising the steps of:
    (a) obtaining a plurality of color separation picture signals and an outline signal by scanning an original picture photoelectrically;
    (b) storing the color separation picture signals and the outline signal into a memory, in parallel;
    (c) reading the color separation picture signals and the outline signal out of the memory, in series; and
    (d) controlling an exposure scanning means by the readout signals, thereby simultaneously recording color separation picture images and an outline image on a photosensitive material.

2. A method as defined in claim 1, wherein the outline signal is obtained from a sharp signal and an unsharp signal which are obtained by scanning the original picture.

3. A method as defined in claim 1, wherein the outline signal is obtained by detecting a particular color tone by which the background or the object portion of the original picture is smeared out.

* * * * *